United States Patent Office 3,738,970
Patented June 12, 1973

3,738,970
POLYVINYL CHLORENDATES
Dennis J. Cimino and John W. Mench, Rochester, and Leonidas H. Pancoast, Jr., Churchville, N.Y., assignors to Eastman Kodak Company, Rochester, N.Y.
No Drawing. Filed July 24, 1972, Ser. No. 274,536
Int. Cl. C08f 27/12
U.S. Cl. 260—78.4 D          5 Claims

ABSTRACT OF THE DISCLOSURE

Polyvinyl chlorendates of a wide range of combined chlorendyl and method of making polyvinyl chlorendates by reacting polyvinyl alcohol with up to about 125 percent of the stoichiometric amount of chlorendic anhydride.

FIELD OF THE INVENTION

This invention relates generally to new compositions of matter and more particularly to new polyvinyl compositions and to the method for making the same.

BACKGROUND OF THE INVENTION

It has been proposed that hydroxyl-containing polymers can be obtained by the reaction of excess polybasic acid anhydrides, such as phthalic, tetrahydrophthalic, trimellitic, and others with polyvinyl alcohol. These polyvinyl compositions are used under conditions where their unique solubility characteristics (organic solvent solubility, water insolubility, but solubility in dilute aqueous alkalies) is desired. These reactions of polybasic acid anhydrides and polyvinyl alcohol are generally carried out in acetic acid or other organic solvent and they are catalyzed by bases such as pyridine or sodium acetate.

These reactions, heterogeneous at the start, are characterized by formation of clear, grain-free reaction dopes from which polymers free from fibers and other insolubles can be isolated by conventional methods of precipitation, washing, and drying. The isolated polymers are generally alkali soluble and highly substituted. The highly substituted polymers are obtained because the addition of the anhydride is used in much greater than stoichiometric amounts, however, the reaction even so does not go to completion.

If less than the stoichiometric amounts of the anhydride are used, the reaction produces very grainy reaction dopes and polymers isolated from such dopes are of poor solubility in both organic solvents and aqueous alkali. In order to insure the preparation of polymers with a high degree of substitution, excess anhydride is almost always used in production. Besides increased production costs because of the excess anhydride, additional costs are incurred because of the large amounts of free, unreacted anhydride which must be removed from the isolated polymers.

SUMMARY OF THE INVENTION

It is therefore an object of this invention to provide as a new composition of matter, a polymer of polybasic acid anhydride and polyvinyl alcohol having a low degree of polybasic acid substitution. A further object of this invention is to provide as new compositions of matter, polyvinyl chlorendates of widely varying degrees of substitution. Another object of this invention is to provide alkali soluble polyvinyl chlorendates. An additional object of this invention is to provide a method of making alkali soluble polyvinyl chlorendates.

These and other objects and advantages of this invention are obtained by reacting polyvinyl alcohol with less than 125 percent of the stoichiometric amount of chlorendic anhydride to obtain a polyvinyl chlorendate of the desired degree of substitution. If less than the stoichiometric amount of chlorendic anhydride is used the polyvinyl chlorendate is alkali soluble.

The polyvinyl chlorendates of this invention are obtained by appending chlorendic anhydrides to the vinyl alcohol polymer molecule and are represented by the following structural Formula I:

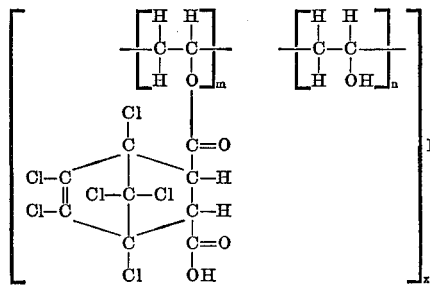

wherein $m$ is 10 to 100 mole percent and $n$ is 0 to 90 mole percent and $x$ is a whole number depending upon the degree of polymerization of the original polyvinyl alcohol.

DETAILED DESCRIPTION OF A PREFERRED EMBODIMENT

The polyvinyl chlorendates of this invention are prepared by reacting polyvinyl alcohol of the desired degree of polymerization with less than 125.0 percent of the stoichiometric amount of chlorendic anhydride. The reaction preferably is carried out in an organic solvent, such as glacial acetic acid. Other solvents such as propionic acid, dimethylformamide, and dimethylsulfoxide may also be used. In the preferred embodiment, the reactants are stirred and heated for about 1 to about 10 hours at a temperature of about 75 to about 150° C. The polyvinyl chlorendate is obtained by precipitation and it is represented by the structure of the following Formula II:

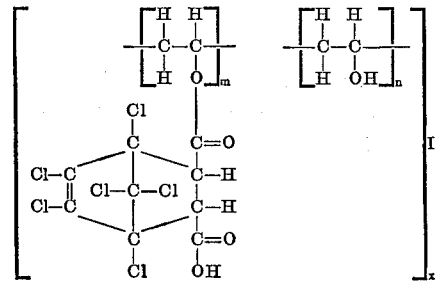

Wherein $m$ is 10 to 100 mole percent and $n$ is 0 to 90 mole percent and $x$ is a whole number depending upon the degree of polymerization of the original vinyl polymer molecule.

The polyvinyl chlorendates of this invention have a degree of substitution of from about 0.1 to about 1.0. These compounds when dissolved in dilute alkali or organic solvents such as dimethylsulfoxide, cyclohexanone, acetone, or organic solvent-water mixtures gave clear solutions which were grain-free. These compounds are useful as antistatic coatings for photographic film bases in the form of their alkali metal salts.

In order to obtain alkali soluble polyvinyl chlorendates and which are prepared without the necessity of excess anhydride, the chlorendic anhydride is used in an amount less than 50 percent of theory and more than about 14 percent of theory. The degree of substitution thus obtained is about 0.40 to about 0.10.

The following examples will further illustrate this invention.

Example 1

One part of polyvinyl alcohol was suspended in 10 parts of glacial acetic acid in which 10.4 parts of chlorendic anhydride (1.23X theory) had also been dissolved. After thorough mixing at 90° C., 0.5 parts of sodium acetate were added. The reaction was run for four hours at 90° C. in a 3-necked flask equipped with stirrer and air-cooled condenser. After dilution with acetic acid, the product was isolated by precipitation into acidified water with rapid stirring. The product was washed free of unreacted chlorendic anhydride with distilled water and dried for 24 hours at 60° C.

The product contained 51.2 percent chlorine corresponding to a degree of esterification of 99 percent. The product showed good solubility in a variety of organic solvents but was not soluble in dilute (0.1 N) ammonia solution.

Example 2

In a reaction vessel as described in Example 1, or in a sigma blade mixer, a series of reactions were run in which the amount of chlorendic anhydride used was reduced by one part in each succeeding reaction. At anhydride levels of about 2 parts or below, the homogeneity of the product is improved by addition of the catalyst to the hot (90° C.) reaction mixture. The data are summarized in the following table:

| Reaction number | Parts anhydride | Percent anhydride of theory | Percent chlorine in product | Degree of substitution |
|---|---|---|---|---|
| 1 | 9 | 106.8 | 51.1 | 0.96 |
| 2 | 8 | 95.0 | 50.7 | 0.89 |
| 3 | 7 | 83.0 | 50.0 | 0.80 |
| 4 | 6 | 71.2 | 48.8 | 0.67 |
| 5 | 5 | 59.2 | 46.7 | 0.51 |
| 6 | 4 | 47.4 | 44.0 | 0.39 |
| 7 | 3 | 35.6 | 40.4 | 0.28 |
| 8 | 2 | 23.7 | 35.0 | 0.19 |
| 9 | 1.2 | 14.3 | 24.7 | 0.09 |
| 10 | 1 | 11.5 | 24.7 | 0.09 |

Reactions 1 through 9 in this series gave clear, brilliant reaction dopes and polymers isolated were uniform and their solutions in organic solvents were clear and grain-free. Only Samples 7, 8, and 9 were soluble in dilute ammonia (0.1 N) at room temperature. At 80° C., Sample 6 was also soluble in dilute ammonia (0.1 N). Sample 10 did not give a clear, brilliant reaction dope because of the very low degree of substitution.

The polyvinyl alcohol in the preferred embodiment has a molecular weight of from 3,000 to 220,000. It has a degree of polymerization of from about 700 to about 5,000.

The invention has been described in detail with particular refererence to preferred embodiments thereof, but it will be understood that variations and modifications can be effected within the spirit and scope of the invention.

What is claimed is:

1. Polyvinyl chlorendates comprising units having the formula:

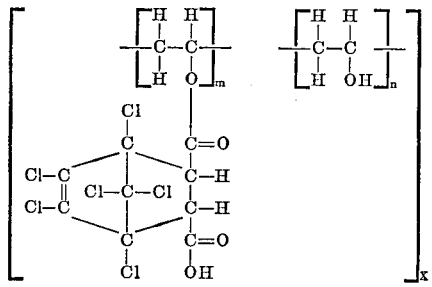

wherein $m$ is 10 to 100 mole percent and $n$ is 0 to 90 mole percent, $x$ is a whole number of from about 700 to about 5,000.

2. Polyvinyl chlorendates according to claim 1 wherein $m$ is 10 to 40 and $n$ is 60 to 90.

3. A method of making polyvinyl chlorendates comprising reacting polyvinyl alcohol and less than 125 percent of the stoichiometric amount of chlorendic anhydride, and recovering the polyvinyl chlorendate.

4. A method of making polyvinyl chlorendates of low degree of substitution comprising reacting polyvinyl alcohol with less than 50 percent of the stoichiometric amount of chlorendic anhydride and recovering the polyvinyl chlorendate.

5. A method according to claim 4 wherein the reaction is carried out in acetic acid and at a temperature of about 75° C. to about 150° C.

References Cited

UNITED STATES PATENTS 3,405,103   10/1968   Crane et al. _____ 260—78.4

JOSEPH L. SCHOFER, Primary Examiner

J. KNIGHT III, Assistant Examiner

U.S. Cl. X.R.

260—78.4 E